Patented Feb. 26, 1952

2,587,549

UNITED STATES PATENT OFFICE 2,587,549

POLYSTYRENES STABILIZED WITH ORGANO AMIDOPHOSPHATES

Quirino A. Trementozzi, Dayton, Ohio, assignor to Monsanto Chemical Company, St. Louis, Mo., a corporation of Delaware No Drawing. Application February 19, 1949, Serial No. 77,449

6 Claims. (Cl. 260—45.9)

This invention relates to styrene polymers which have improved stability with respect to molecular weight degradation. More particularly the invention relates to a method of improving styrene polymers by mixing them with amidophosphate derivatives.

Polystyrene and various copolymers of styrene and other mono-olefinic compounds are valuable industrial materials. These polymers, however, are known to be subject to molecular degradation when subjected to elevated temperatures for prolonged periods of time. This degradation is a reduction in the molecular weight, caused by the breaking of the long polymer chains into polymer chains of shorter length. One method of minimizing molecular degradation is to remove the lower molecular weight fractions by alcohol washing. Industry has long desired a commercial product as stable as the alcohol washed polystyrene, the alcohol washing procedure being an impracticable expedient.

It is known that the physical properties of styrene polymers are depreciated and their utility is restricted by this molecular degradation. The extent of degradation can be most conveniently measured by the viscosity decrease of a solution of the polymer in a suitable solvent, for which solvent the relationship of viscosity and molecular weight has been determined by a direct method, for example by osmotic pressure, light scattering, or ultracentrifugal means.

The primary purpose of this invention is to provide a styrene polymer which is more resistant to the degradation in molecular weight. A further purpose of this invention is to provide an additive for styrene resins which enable the styrene to resist the deleterious effects of high temperatures.

It has been found that N,N-dialkylamidophosphates having the following structural formula:

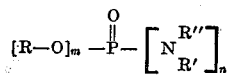

wherein $m$ is a small whole number from zero to two, inclusive, $n$ is a small whole number from one to three, inclusive, wherein the sum of $n$ and $m$ is always equal to three, and in which R, R' and R" are alkyl groups having from one to two carbon atoms. Suitable amidophosphates of the structure defined above are: tris-(N,N-dimethylamido) phosphate, bis-(N,N-dimethylamido) methyl phosphate, N,N-dimethylamido-dimethylphosphate, and these compounds wherein one or more of the methyl groups are replaced by ethyl radicals.

The chemical compounds are prepared by reacting a diamine, for example dimethyl amine, ethyl methyl amine, or diethyl amine, with phosphorus oxychloride, or a partially esterified oxychloride, such as the partial methyl esters and partial ethyl esters. Thus, one, two or three N,N-dialkylamido radicals may be introduced. The phosphorus oxychlorides are reacted with three moles of the amine, the mono-methyl or ethyl esters with two moles of the amine, and the dimethyl or diethyl esters with one mole of the amine. The reactions are generally conducted in a solution in a suitable inert hydrocarbon, for example toluene or xylene. The phosphorus compound being dissolved in the solution and the gaseous amine passed into the solution while maintaining the temperature between 50 and 100° C. The various dialkylamidophosphates may be separated from each other and other reaction products by distillation at reduced pressures.

The N,N-dialkylamidophosphates so prepared are useful in the stabilization of polystyrene, and various copolymers of styrene, especially those of at least 50 percent styrene and up to 50 percent of other mono-olefinic monomers, for example acrylonitrile, α-methylstyrene, vinyl biphenyl, methacrylonitrile, alkyl acrylates, such as methyl acrylate, alkyl methacrylates, such as methyl methacrylate, fumaronitrile, alkyl fumarates, such as ethyl fumarate, alkyl maleates, such as ethyl maleate, alkylated styrenes, and alkylated vinyl biphenyls. The alkyl esters of the above monomers may have alkyl groups with up to eight carbon atoms.

The new stabilized polystyrene or copolymers of styrene and other mono-olefinic monomers are prepared by mixing the N,N-dialkylamidophosphates with the polymers by any of a variety of conventional methods. They may be mixed on a roll mill or other standard device for mixing solids. If desired the plastic composition may be dissolved or softened by addition of a suitable solvent, for example acetone, and the solution mixed with the amidophosphate followed by evaporation of the solvent. If desired the stabilizing agents may be added to the monomer prior to the polymerization and incorporated therein during polymerization. The N,N-dimethyl and N,N-diethylamidophosphates are effective stabilizers in concentrations varying from 0.1 to five percent by weight, but preferred compositions will have from 0.5 to three percent of the stabilizing agents.

Further details of the practice of this invention are set forth with respect to the following specific examples.

Example 1

A solution of polystyrene in toluene was heated for thirty days at a temperature of 100° C. in the presence of air. Periodic measurements were made of its specific viscosity. An identical solution containing in addition three percent of tris-(dimethylamido) phosphate (based on the polymer) was subjected simultaneously to the same conditions. After thirty days treatment the unstabilized polystyrene had suffered a loss of 72.3 percent of its specific viscosity. The solution containing three percent tris-(dimethylamido) phosphate by weight was found to have lost only 21.5 percent of its specific viscosity.

A sample of alcohol washed polystyrene was subjected to the same conditions and a loss in specific viscosity of 23.8 percent was observed.

Example 2

A solution of polystyrene in toluene containing 0.8 percent tris-(dimethylamido) phosphate by weight (i. e., 0.8 percent by weight of the polymer) lost only 34.5 percent of its specific viscosity under the identical treatment described of the previous example.

The invention is defined by the following claims.

I claim:

1. A polymer having improved stabilization to molecular weight degradation which comprises a styrene polymer and from 0.1 to five percent by weight of a compound having the structural formula:

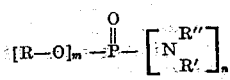

wherein $m$ is a small whole number from zero to two, inclusive, $n$ is a small whole number from one to three, inclusive, wherein the sum of $n$ and $m$ is always equal to three, and in which R, R' and R'' are alkyl groups having from one to two carbon atoms.

2. A polymer having improved stabilization to molecular weight degradation which comprises polystyrene and from 0.1 to five percent by weight of a compound having the structural formula:

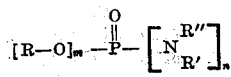

wherein $m$ is a small whole number from zero to two, inclusive, $n$ is a small whole number from one to three, inclusive, wherein the sum of $n$ and $m$ is always equal to three, and in which R, R' and R'' are alkyl groups having from one to two carbon atoms.

3. A polymer having improved stabilization to molecular weight degradation which comprises a copolymer of at least 50 percent by weight of styrene and up to 50 percent of another monoolefinic monomer, containing intimately dispersed therein from 0.1 to five percent by weight of a compound having the structural formula:

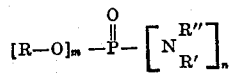

wherein $m$ is a small whole number from zero to two, inclusive, $n$ is a small whole number from one to three, inclusive, wherein the sum of $n$ and $m$ is always equal to three, and in which R, R' and R'' are alkyl groups having from one to two carbon atoms.

4. A polymer having improved stabilization to molecular weight degradation which comprises a styrene polymer having intimately dispersed therein from 0.1 to five percent by weight of tris-(dimethylamido) phosphate.

5. A polymer having improved stabilization to molecular weight degradation which comprises polystyrene having intimately dispersed therein from 0.1 to five percent by weight of tris-(dimethylamido) phosphate.

6. A polymer having improved stabilization to molecular weight degradation which comprises a copolymer of at least 50 percent by weight of styrene and up to 50 percent of another monoolefinic monomer containing intimately dispersed therein from 0.1 to five percent by weight of tris-(dimethylamido) phosphate.

QUIRINO A. TREMENTOZZI.

REFERENCES CITED

The following references are of record in the file of this patent:

UNITED STATES PATENTS

| Number | Name | Date |
|---|---|---|
| 2,487,859 | Dickey et al. | Nov. 15, 1949 |